US012694160B1

(12) United States Patent
Berger

(10) Patent No.: US 12,694,160 B1
(45) Date of Patent: Jul. 28, 2026

(54) ARTIFICIAL INTELLIGENCE SYSTEMS AND METHODS FOR GOVERNANCE-GATED RELATIONAL COORDINATION, CROSS-DOMAIN PROPAGATION, AND COMPATIBILITY PROCESSING OF COMPOSITE RELATIONAL ENTITIES

(71) Applicant: RAIN HOLDINGS, INC., Laguna Beach, CA (US)

(72) Inventor: Marc Berger, Laguna Beach, CA (US)

(73) Assignee: RAIN HOLDINGS, INC., Laguna Beach, CA (US)

( * ) Notice: Subject to any disclaimer, the term of this patent is extended or adjusted under 35 U.S.C. 154(b) by 0 days.

(21) Appl. No.: 19/425,624

(22) Filed: Dec. 18, 2025

(51) Int. Cl.
G06F 21/64 (2013.01)
G06F 21/53 (2013.01)

(52) U.S. Cl.
CPC .............. *G06F 21/64* (2013.01); *G06F 21/53* (2013.01)

(58) Field of Classification Search
CPC ................................ G06F 21/64; G06F 21/53
See application file for complete search history.

(56) References Cited

U.S. PATENT DOCUMENTS

| | | | |
|---|---|---|---|
| 9,430,662 B2 | 8/2016 | Giambiagi et al. | |
| 10,277,608 B2 | 4/2019 | Krishnamurthy | |
| 10,936,959 B2 | 3/2021 | Baveja et al. | |
| 11,556,862 B2 | 1/2023 | Polleri et al. | |
| 11,593,560 B2 | 2/2023 | Zhou et al. | |
| 11,593,622 B1 | 2/2023 | Gandhi et al. | |
| 11,755,754 B2 | 9/2023 | Joshi et al. | |
| 11,775,663 B2 | 10/2023 | Laurance et al. | |
| 2008/0243607 A1 | 10/2008 | Rohan et al. | |
| 2021/0383525 A1* | 12/2021 | Lee | G06N 3/045 |
| 2021/0392132 A1* | 12/2021 | Olden | H04L 67/1095 |
| 2021/0406779 A1 | 12/2021 | Hu et al. | |
| 2023/0401461 A1* | 12/2023 | Gueret | G06N 20/00 |
| 2024/0202221 A1* | 6/2024 | Siebel | G06N 3/0475 |

(Continued)

OTHER PUBLICATIONS

He et al., "A Latent Representation Generalizing Network for Domain Generalization in Cross-Scenario Monitoring", Jul. 2023, IEEE Transactions on Neural Networks and Learning Systems, vol. 35, No. 11, pp. 16644-16658 (Year: 2023).*

(Continued)

*Primary Examiner* — Kenneth W Chang
(74) *Attorney, Agent, or Firm* — Wilson Sonsini Goodrich & Rosati

(57) ABSTRACT

The present disclosure provides artificial intelligence systems, methods, and media for governance-gated relational coordination, compatibility computation, cross-domain propagation, and synchronization of Composite Relational Entities (CREs). The system performs compatibility scoring, trust-modulated comparison, governance-weighted negotiation, lifecycle-aware synchronization, and delta-based propagation, each contingent upon machine-enforced validation requirements. These mechanisms provide a non-generic practical application that improves the functioning of computer systems by reducing bandwidth consumption, increasing security, enforcing cross-domain lifecycle continuity, and preventing propagation of invalid or unauthorized relational objects.

30 Claims, 6 Drawing Sheets

(56) References Cited

U.S. PATENT DOCUMENTS

2025/0328341 A1* 10/2025 Gutierrez .............. G06F 3/0484

OTHER PUBLICATIONS

Li et al., "Cross-Domain AI Towards 6G: Requirements, Solution, and Validation", May 2024, International Wireless Communications and Mobile Computing, pp. 456-460 (Year: 2024).*

Fey, Matthias. et al. Relational deep learning: Graph representation learning on relational databases. arXiv preprint arXiv:2312.04615, 1-21 (2023).

Sidi-Ali, Muhammad Adamu. et al. Adapting Performance And Emotional Support Feedback To Cultural Differences. UMAP '19: Proceedings of the 27th ACM Conference on User Modeling, Adaptation and Personalization :318-326 (2019).

Wu, Zijian. et al. Cross-domain decision making with parameter transfer based on value function. Information Sciences 610:777-799 (2022).

Yin, Gongzhu. et al. Beyond individuals: Modeling mutual and multiple interactions for inductive link prediction between groups. Proceedings of the Sixteenth ACM International Conference on Web Search and Data Mining :751-759 (2023).

Yuan, Feng. et al. DARec: Deep domain adaptation for cross-domain recommendation via transferring rating patterns. arXiv preprint arXiv:1905.10760, 1-7 (2019).

Hu, Vincent., Guide to Attribute Based Access Control (ABAC) Definition and Considerations, NIST Special Publication 800-162, National Institute of Standards and Technology, Gaithersburg, MD, Jan. 2014 (with updates as of Aug. 2, 2019).

Pang, Caceres., Zanzibar: Google's Consistent, Global Authorization System, USENIX ATC 2019.

U.S. Appl. No. 19/413,985 Office Action dated Apr. 9, 2026.

* cited by examiner

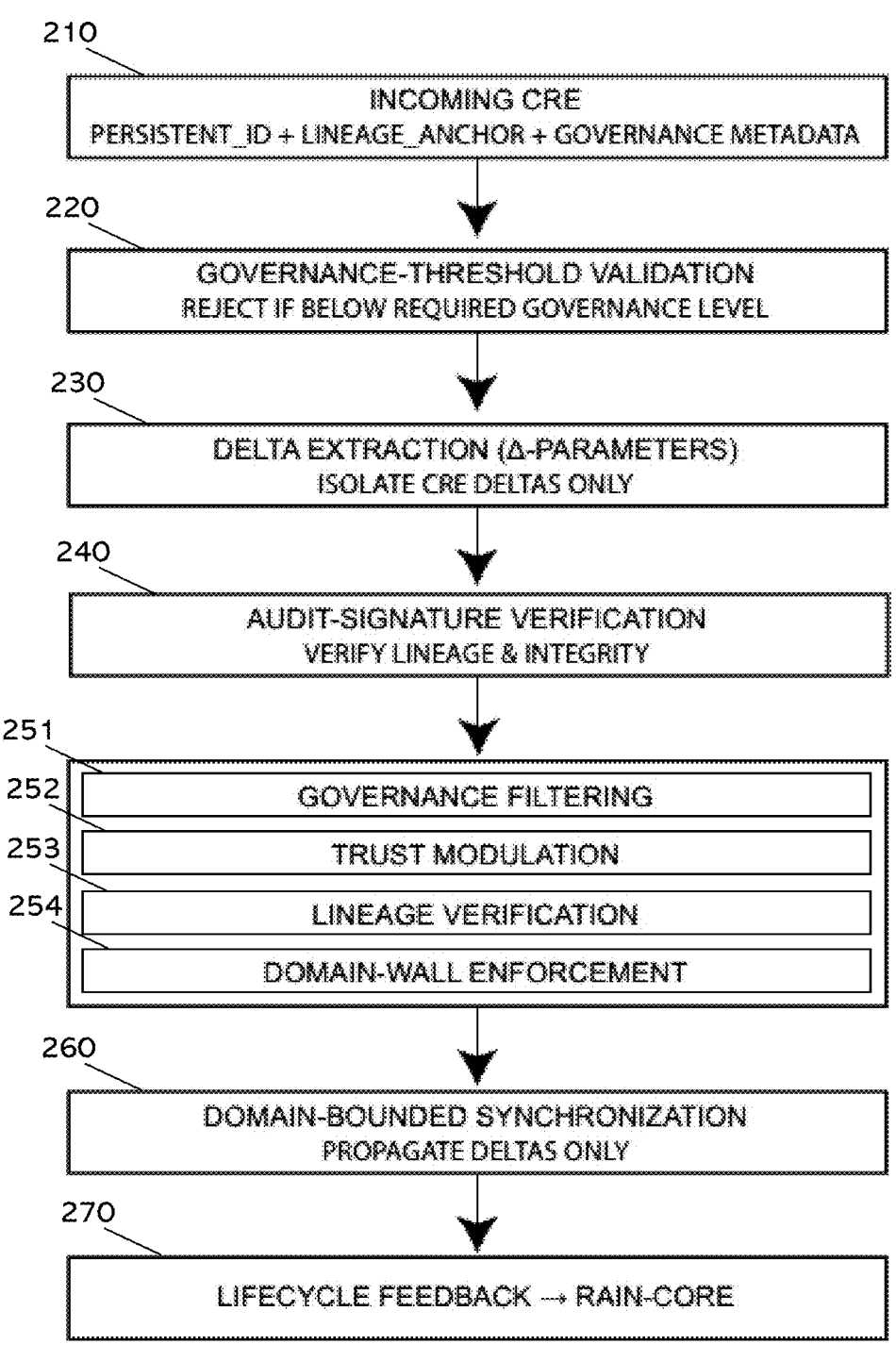

210

INCOMING CRE
PERSISTENT_ID + LINEAGE_ANCHOR + GOVERNANCE METADATA

220

GOVERNANCE-THRESHOLD VALIDATION
REJECT IF BELOW REQUIRED GOVERNANCE LEVEL

230

DELTA EXTRACTION (Δ-PARAMETERS)
ISOLATE CRE DELTAS ONLY

240

AUDIT-SIGNATURE VERIFICATION
VERIFY LINEAGE & INTEGRITY

251
252
253
254

GOVERNANCE FILTERING

TRUST MODULATION

LINEAGE VERIFICATION

DOMAIN-WALL ENFORCEMENT

260

DOMAIN-BOUNDED SYNCHRONIZATION
PROPAGATE DELTAS ONLY

270

LIFECYCLE FEEDBACK → RAIN-CORE

ARTIFICIAL INTELLIGENCE SYSTEMS AND METHODS FOR GOVERNANCE-GATED RELATIONAL COORDINATION, CROSS-DOMAIN PROPAGATION, AND COMPATIBILITY PROCESSING OF COMPOSITE RELATIONAL ENTITIES

BACKGROUND

Matching and recommendation systems can be useful in connecting users, items, or entities based on shared characteristics, preferences, or contextual factors. Such systems may be applied across a variety of domains including social networking, professional recruiting, e-commerce, and travel planning.

SUMMARY

While matching and recommendation are illustrative use cases, the disclosed architecture more generally addresses persistent identity continuity, governance-gated coordination, and cross-domain compatibility evaluation for machine and human entities across distributed systems. Moreover, conventional artificial-intelligence systems rely on centralized training pipelines in which large datasets are periodically retrained to produce static models. These architectures perform poorly in dynamic relational environments, such as social, professional, or commercial ecosystems, where interactions and feedback evolve continuously across multiple platforms.

Existing relational-matching engines generally operate as closed, domain-specific systems. They lack interoperability, depend on static correlation matrices, and fail to exchange learned parameters or feedback information between domains. Insights obtained in one context (for example, a social network) cannot be transferred to another (such as a professional-matching platform), resulting in redundant computation and loss of contextual fidelity.

Distributed-learning methods such as federated or peer-to-peer synchronization improve privacy but remain limited: they perform coarse parameter sharing, lack interpretability, and require full-model retraining to incorporate new feedback. Users and operators cannot easily determine why a compatibility result was generated, nor can these systems efficiently synchronize relational intelligence across heterogeneous environments.

The systems, methods, and media described herein introduce multiple concrete advancements over conventional distributed-learning and relational-modeling systems. Unlike prior architectures that rely on bulk data aggregation or coarse federated synchronization, the systems, methods, and media described herein employ fine-grained, trust-weighted coordination.

In addition, the present disclosure achieves measurable improvements in computer efficiency by: (a) minimizing redundant data propagation through its synchronization engine topology, (b) maintaining and using smaller, self-contained Composite Relational Entities (CREs) that can be independently updated without full-model retraining, and (c) applying governance-weighted aggregation to prioritize high-confidence domains during synchronization. Taken separately or collectively, these advancements produce a technical improvements in distributed machine-learning infrastructure. The disclosed architecture provides machine-level improvements including: (i) reduced bandwidth consumption via governance-weighted CRE delta propagation; and (ii) architectural enhancements such as persistent composite identity, lineage continuity across domains, governance-modulated compatibility scoring, and (ii) lifecycle-based interpretability vectors that enable non-generic relational computation.

In addition, the system, methods, and media described herein can be used to evaluate compatibility of groups and between groups. Compatibility scores may be generated for individual CREs, wherein the compatibility score represents compatibility between the entities which the CRE represents. In addition, compatibility scores may be generated for two or more CREs, wherein the score represents the evaluated compatibility of the two or more groups represented by the two or more CREs. Accordingly, systems, methods, and media described herein support both individual (e.g. intra-CRE) and cross-CRE evaluation and scoring.

Disclosed herein is a computer-implemented method for governance-gated propagation, compatibility evaluation, and cross-domain coordination of composite relational entities (CREs) executed at one or more computer processors, the method comprising: receiving, one or more CREs generated by a synthesis engine, wherein each CRE represents two or more entities; conducting a first validation of a CRE of the one or more CREs comprising validating a persistent identifier and a lineage anchor of the CRE; upon a successful result of the first validation, processing the CRE by performing operations comprising: computing a compatibility score for the CRE based on governance metadata, trust coefficients, and an interpretability vector included in the CRE, wherein the compatibility score represents compatibility between the entities, capturing feedback associated with at least one of the two or more entities, computing a residual deviation between the compatibility score and the feedback, applying a governance-weighted update rule to modulate the residual deviation based on the governance metadata and the trust coefficients, updating one or more parameters of the CRE based at least in part on the modulated residual deviation, and generating a CRE delta, wherein the CRE delta represents a difference between the updated one or more parameters and the one or more parameters of the CRE; conducting a second validation of the CRE comprising validating the persistent identifier, the lineage anchor, an audit signature, and the governance metadata; and upon a successful result of the second validation, propagating the CRE delta. In some embodiments, the lineage anchor comprises a timestamp, hash, or cryptographic marker referencing a prior CRE state. In some embodiments the audit signature is associated with the persistent identifier and the lineage anchor. In some embodiments, propagation is rejected when lineage continuity validation fails. In some embodiments the CRE is structurally non-substitutable with embeddings, weighted attribute vectors, or similarity metrics. In some embodiments, the one or more CREs comprise normalized multi-attribute vectors. In some embodiments the CRE comprises trust coefficients, and wherein the trust coefficients are based on historical consistency of underlying entity attributes associated with the CRE. In some embodiments, the governance metadata comprises a governance weight applied during compatibility score computation and CRE delta propagation. In some embodiments, the interpretability vector quantifies contributions of relational attributes of the two or more entities to the computation of the compatibility score. In some embodiments, the method further comprises computing a second compatibility score between two or more of the CREs based on respective governance metadata, trust coefficients, and interpretability vectors included in the two or more CREs, wherein the second compatibility score represents compatibility between the CREs. In some embodiments, computing the residual deviation comprises applying a temporally weighted deviation term. In some embodiments, capturing feedback comprises collecting behavioral outcome data. In some embodiments, the CRE comprises metadata embedded directly into a latent data structure of the CRE, thereby enforcing metadata inseparability. In some embodiments, the method further comprises receiving a second CRE and evaluating the compatibility between the CRE and the second CRE thereby generating a second compatibility score.

Described herein, is a non-transitory computer-readable medium storing instructions that, when executed by one or more processors, cause the processors to perform receiving, one or more CREs generated by a synthesis engine, wherein each CRE represents two or more entities; conducting a first validation of a CRE of the one or more CREs comprising validating a persistent identifier and a lineage anchor of the CRE; upon a successful result of the first validation, processing the CRE by performing operations comprising: computing a compatibility score for the CRE based on governance metadata, trust coefficients, and an interpretability vector included in the CRE, wherein the compatibility score represents compatibility between the entities, capturing feedback associated with at least one of the two or more entities, computing a residual deviation between the compatibility score and the feedback, applying a governance-weighted update rule to modulate the residual deviation based on the governance metadata and the trust coefficients, updating one or more parameters of the CRE based at least in part on the modulated residual deviation, and generating a CRE delta, wherein the CRE delta represents a difference between the updated one or more parameters and the one or more parameters of the CRE; conducting a second validation of the CRE comprising validating the persistent identifier, the lineage anchor, an audit signature, and the governance metadata; and upon a successful result of the second validation, propagating the CRE delta. In some embodiments, the instructions further cause the one or more processors to enforce metadata inseparability for all CREs. In some embodiments, the instructions further cause the one or more processors to recalculate the audit signature after propagation.

Described herein is a computer-implemented system for governance-gated propagation, compatibility evaluation, and cross-domain coordination of composite relational entities (CREs) executed at one or more computer processors, comprising: a CRE-intake module configured to receive one or more CREs; a validation module configured to perform: a first validation of a persistent identifier, and a lineage anchor of a CRE of the one or more CREs, and a second validation of the persistent identifier, the lineage anchors, and an audit signature of the CRE; a compatibility engine configured to compute a compatibility score from the CRE based on governance metadata, trust coefficients, and an interpretability vector included in the CRE upon a successful result of the first validation; a governance-weighted update module configured to, upon a successful result of the first validation: compute a residual deviation between the compatibility score and feedback, apply a governance-weighted update rule to module the residual deviation based on the governance metadata and the trust coefficients, update one or more parameters of the CRE based at least in part on the modulated residual deviation, and generate a CRE delta, wherein the CRE delta represents a difference between the updated one or more parameters and the one or more parameters of the CRE; and a synchronization engine configured to propagate the CRE delta upon a successful result of the second validation. In some embodiments, the at least one computer processor comprises a secure execution enclave. In some embodiments, the secure execution enclave is a trusted execution environment (TEE). In some embodiments, at least the propagation occurs within the secure execution enclave. In some embodiments, the synchronization engine is configured to block propagation of the CRE if the governance metadata fails a validation. In some embodiments, the compatibility engine is configured to recalculate the interpretability vector after the second validation. In some embodiments, the compatibility engine is configured to compute a second compatibility score between two or more of the CREs based on respective governance metadata, trust coefficients, and interpretability vectors included in the two or more CREs, wherein the second compatibility score represents compatibility between the CREs. In some embodiments, the validation module is configured to output a rejection state when the first validation or the second validation are unsuccessful.

Described herein is a computer-implemented method for governance-gated propagation, compatibility evaluation, and cross-domain coordination of composite relational entities (CREs) executed at one or more computer processors, the method comprising: receiving, a plurality of CREs generated by two or more domain-specific synthesis engines, wherein each CRE represents two or more entities; conducting a first validation of two of more of the plurality of CREs comprising validating persistent identifiers, lineage anchors, and audit signatures of the two or more CREs; upon a successful result of the first validation, evaluating relational compatibility between the two or more CREs thereby generating a compatibility score; updating one or more parameters of each of the two or more CREs; generating a CRE delta for each of the two or more CREs, wherein the CRE delta represents a difference between the updated one or more parameters and the one or more parameters of each CRE; conducting a second validation of the two or more CREs comprising validating the persistent identifier, the lineage anchor, and the audit signature of the two or more CREs; and upon a successful result of the second validation, propagating the CRE deltas across a plurality of domains. In some embodiments, each CRE comprises a domain identifier configured to restrict cross-domain reuse. In some embodiments, the two or more domain-specific relational synthesis engines are configured to not share parameters unless governance conditions are satisfied. In some embodiments, the feedback is specific to a domain. In some embodiments, propagating the CRE deltas is restricted unless a domain-continuity rule is satisfied. In some embodiments, the two or more CREs are each generated by a relational synthesis engine specific to a different domain. In some embodiments, generating the compatibility score comprises using governance-weighted normalization. As used herein, regeneration refers to re-issuance of a CRE by a synthesis engine using updated parameters, rather than synthesis performed by the coordination layer.

Described herein is a computer-implemented method for governance-gated propagation, compatibility evaluation, and cross-domain coordination of composite relational entities (CREs), comprising: receiving, at a coordination layer, one or more CREs generated by a synthesis engine of a separate system; validating a persistent identifier and lineage anchor of each CRE prior to accepting the CRE for processing; computing a compatibility score for the CRE based on governance metadata, trust coefficients, and an interpretability vector included in the CRE; capturing observed feedback associated with one or more entities represented by the CRE; computing a residual deviation between the compatibility score and the observed feedback; applying a governance-weighted update rule to modulate the residual deviation based on governance metadata and trust coefficients of the CRE; and propagating a CRE delta only after successful validation of the persistent identifier, lineage anchor, audit signature, and governance metadata. In some embodiments, the lineage anchor comprises a timestamp, hash, or cryptographic marker referencing a prior CRE state. In some embodiments, validating the CRE prior to propagation comprises verifying an audit signature associated with the persistent identifier and the lineage anchor. In some embodiments, propagation is rejected when lineage continuity validation fails. In some embodiments, the CRE is structurally non-substitutable with embeddings, weighted attribute vectors, or similarity metrics. In some embodiments, CREs comprise normalized multi-attribute vectors. In some embodiments, trust coefficients are computed based on historical consistency of underlying entity attributes. In some embodiments, the governance metadata comprises a governance weight applied during compatibility computation and propagation. In some embodiments, the interpretability vector comprises sensitivities of the compatibility score to relational attributes. In some embodiments, computing the residual deviation comprises applying a temporally weighted deviation term. In some embodiments, capturing observed feedback comprises collecting behavioral outcome data. In some embodiments, propagation occurs within a trusted execution environment. In some embodiments, metadata inseparability is enforced by embedding metadata directly into a latent data structure of the CRE. In some embodiments, the method further comprises verifying an audit token prior to propagation.

Described herein, is a non-transitory computer-readable medium storing instructions that, when executed by one or more processors, cause the processors to perform receiving, at a coordination layer, one or more CREs generated by a synthesis engine of a separate system; validating a persistent identifier and lineage anchor of each CRE prior to accepting the CRE for processing; computing a compatibility score for the CRE based on governance metadata, trust coefficients, and an interpretability vector included in the CRE; capturing observed feedback associated with one or more entities represented by the CRE; computing a residual deviation between the compatibility score and the observed feedback; applying a governance-weighted update rule to modulate the residual deviation based on governance metadata and trust coefficients of the CRE; and propagating a CRE delta only after successful validation of the persistent identifier, lineage anchor, audit signature, and governance metadata. In some embodiments, the instructions further cause the system one or more processors to enforce metadata inseparability for all CREs. In some embodiments, the instructions further cause the one or more processors to validation validate of the lineage anchor prior to propagation. In some embodiments, the instructions further cause the one or more processors to recalculation recalculate of an audit signature after propagation.

Described herein is a computer-implemented system comprising: a CRE-intake module configured to receive CREs generated by a synthesis engine of a separate system; a validation module configured to verify a persistent identifier, lineage anchor, and audit signature of each CRE prior to processing; a compatibility engine configured to compute compatibility scores using governance metadata, trust coefficients, and interpretability vectors contained in the CRE; a governance-weighted update module configured to compute a residual deviation between compatibility scores and observed feedback and apply a governance-weighted adjustment; and a secure execution enclave configured to propagate CRE deltas only upon successful validation by the validation module. In some embodiments, the secure execution enclave comprises a hardware-backed trusted execution environment. In some embodiments, the validation module verifies cryptographic signatures associated with lineage anchors. In some embodiments, propagation is blocked when governance metadata fails validation. In some embodiments, the compatibility engine recalculates the interpretability vector during propagation evaluation. In some embodiments, the validation module outputs a rejection state when lineage anchor validation fails.

Described herein is a computer-implemented method comprising: receiving, at a coordination architecture, a plurality of CREs generated by domain-specific synthesis engines; validating persistent identifiers, lineage anchors, and audit signatures of the CREs; performing governance-gated compatibility scoring across domains; and propagating CRE deltas across the plurality of domains only when governance thresholds and lineage-continuity constraints are satisfied. In some embodiments, domain-specific CREs include domain identifiers restricting cross-domain reuse. In some embodiments, the domain-specific relational synthesis engines share no parameters unless governance conditions are satisfied. In some embodiments, when updating parameter values. In some embodiments, cross-domain propagation is restricted unless a domain-continuity rule is satisfied. In some embodiments, compatibility scoring across domains comprises governance weighted normalization.

Across the embodiments described herein, the disclosed coordination, compatibility evaluation, governance-gated propagation, and synchronization operations are implemented with respect to CREs produced by a synthesis architecture. The CRE construct therefore provides a consistent structural context through which the system functions operate.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 2 depicts an example flow diagram of a composite relational entity (CRE) processing pipeline;

FIG. 3 depicts an example compatibility and aggregation flow for multiple CREs;

DETAILED DESCRIPTION

Figure 1:
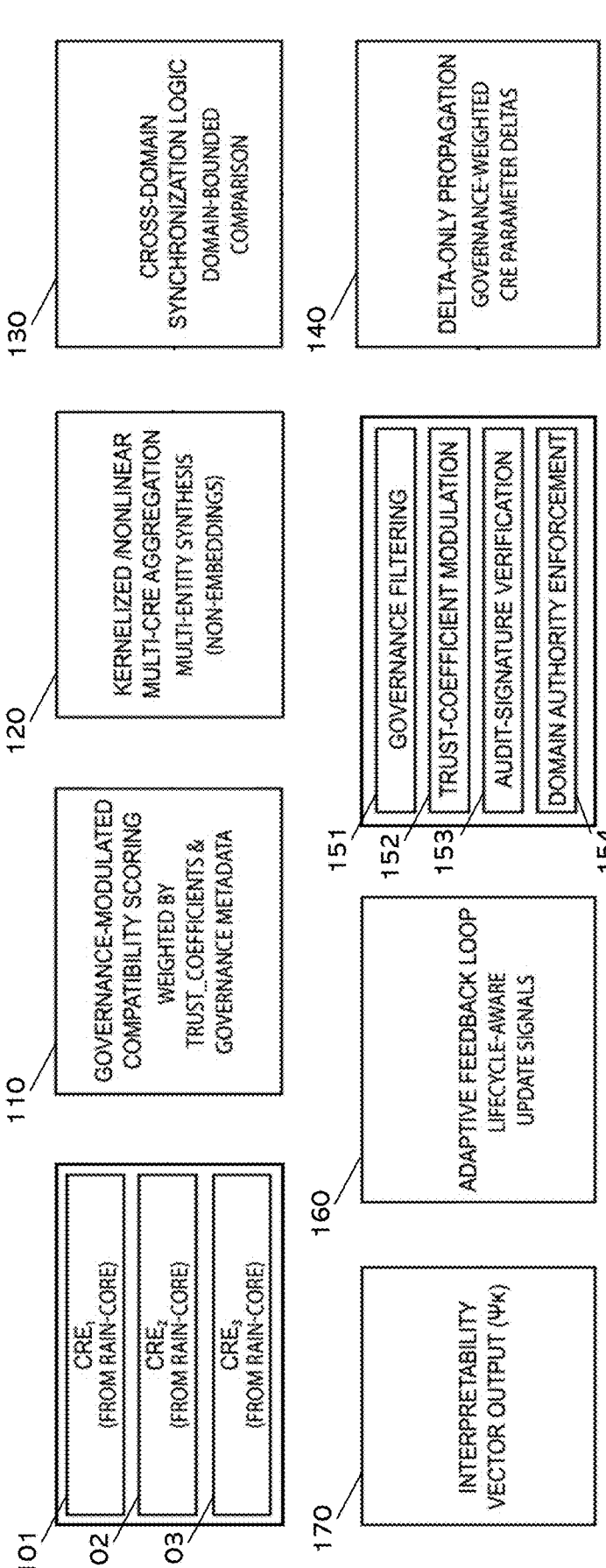
FIG. 1 depicts an example system architecture diagram of a system for relational coordination.

In some embodiments, systems, methods, and media described herein are configured to operate on composite relational entities (CREs) generated from two or more entities. In some embodiments, the system comprises two or more independent machine-learning systems or engines. In some embodiments, each independent machine-learning system or engine corresponds to a domain. In some embodiments, each engine is configured to generate a composite relational entity (CRE) from two or more entities as described in U.S. patent application Ser. No. 19/413,985, entitled AI SYSTEMS AND METHODS FOR ADAPTIVE CROSS-DOMAIN COMPOSITE RELATIONAL SYNTHESIS AND INTEROPERABILITY, filed on Dec. 9, 2025, and listing as inventor Marc Berger, which is hereby incorporated by reference in its entirety.

In some embodiments, systems, methods, and media described herein implement continuous, feedback-driven refinement of model parameters used in CRE updating or generation. The systems, methods, and media described herein do not synthesize CREs but rather provide coordination, evaluation, and propagation over CREs generated by a separate synthesis architecture. They provide for updating the parameters of synthesis engines described in U.S. patent application Ser. No. 19/413,985, entitled AI SYSTEMS AND METHODS FOR ADAPTIVE CROSS-DOMAIN COMPOSITE RELATIONAL SYNTHESIS AND INTEROPERABILITY, filed on Dec. 9, 2025, and listing as inventor Marc Berger, which is hereby incorporated by reference in its entirety. For example, each engine may update aggregation functions, governance weights, or other trainable parameters based on observed outcomes, relational comparisons, or external feedback signals. In some embodiments, updates occur independently within each engine or are coordinated across multiple engines. In some embodiments, coordination of updates across multiple engines is facilitated by a bus. In some embodiments, engines are specific to domains. In some embodiments, updates to the engines are weighted according to domain-specific reliability measures, audit tokens, or other trust coefficients to ensure that contributions from each engine are verifiable, compliant, or interpretable.

In some embodiments, relational insights learned in one domain are integrated into other domains. For example, a CRE from a first domain may serve as input, reference, or context for evaluation, updating, or propagation of CREs in a second domain. In some embodiments, cross-domain integration improves predictive performance, reduces computational redundancy, and enhances interpretability relative to systems that perform isolated, domain-specific model training. In some embodiments, each engine optionally stores provenance and interpretability records for CREs, enabling tracing of contributions from each constituent entity and each domain.

In some embodiments, a system described herein is configured to receive a plurality of entity profiles as described in U.S. patent application Ser. No. 19/413,985, entitled AI SYSTEMS AND METHODS FOR ADAPTIVE CROSS-DOMAIN COMPOSITE RELATIONAL SYNTHESIS AND INTEROPERABILITY, filed on Dec. 9, 2025, and listing as inventor Marc Berger, which is hereby incorporated by reference in its entirety. In some embodiments, each entity profile comprises one or more attributes associated with an entity. In some embodiments, the attributes are normalized. In some embodiments, normalized features include demographic attributes, behavioral metrics, contextual indicators, or other measurable characteristics. In some embodiments, each entity profile is represented as a multi-dimensional vector $E_i$ whose components correspond to normalized attributes.

In some embodiments, CREs are composable and two or more CREs are combined to synthesize a new governed composite. In some embodiments, the resulting composite is configured to maintain full provenance of all underlying governance weights and governance tokens, including audit and usage token information. In some embodiments, the system is configured to track interactions without compromising transparency or governance integrity. In some embodiments, the system is configured to recombine existing CREs into higher-order nested CRE structures ('composites of composites') to model group-level relational dynamics. In some embodiments, multiple CREs are aggregated using nonlinear or kernelized operations. In some embodiments, CREs are updated or regenerated. In some embodiments, each newly updated or regenerated CRE inherits governance metadata from its constituent CREs. This can create a chain of reasoning which can be reviewed. In some embodiments, the system is configured to track, evaluate, and explain interactions across multiple levels of aggregation.

In some embodiments, a CRE comprises governance metadata, trust coefficients, a lineage anchor, and a persistent identifier as described in U.S. patent application Ser. No. 19/413,985, entitled AI SYSTEMS AND METHODS FOR ADAPTIVE CROSS-DOMAIN COMPOSITE RELATIONAL SYNTHESIS AND INTEROPERABILITY, filed on Dec. 9, 2025, and listing as inventor Marc Berger, which is hereby incorporated by reference in its entirety.

In some embodiments, a CRE is validated. In some embodiments, a CRE is validated by validating a persistent identifier of the CRE. In some embodiments, a CRE is validated by validating a lineage anchor of the CRE. In some embodiments, a CRE is validated by validating a persistent identifier of the CRE. In some embodiments, a CRE is validated by validating the governance metadata of the CRE. In some embodiments, a CRE is validated by validating a lineage anchor of the CRE. In some embodiments, validation of a lineage anchor comprise confirming lineage continuity of the CRE. In some embodiments, a lineage anchor comprises a timestamp, hash, or cryptographic marker referencing a prior CRE state. In some embodiments, validation of the CRE comprises using the timestamp, hash, or cryptographic marker of the lineage anchor to confirm that the CRE is derived from an expected prior CRE state, including verifying that the marker matches a cryptographically stored record and that no intermediate lineage steps have been altered, omitted, or reordered. In some embodiments, a CRE is validated by validating the governance metadata of the CRE by comparing the governance metadata to expected governance metadata for the CRE. In some embodiments, validation of a CRE is performed by a validation module. In some embodiments, the system comprises a validation module configured to validate the CRE. In some embodiments, a CRE is validated by validating an audit signature of the CRE. In some embodiments, an audit signature is associated with the persistent identifier and the lineage anchor of the CRE.

In some embodiments, a CRE is evaluated for compatibility. In some embodiments, evaluation for compatibility is contingent on validation of the CRE. In some embodiments, a CRE may not be evaluated for compatibility unless it has successfully been validated. In some embodiments, the system comprises a compatibility engine configured to evaluate a CRE for compatibility. In some embodiments, a compatibility score is computed or generated for a CRE, wherein the compatibility score represents compatibility between the entities the CRE represents. The compatibility score may represent a quantitative assessment of the relational state, affinity level, or compatibility condition among the entities the CRE represents. In some embodiments, the compatibility engine is configured to compute a compatibility score for a CRE. In some embodiments, the compatibility engines computes the compatibility score by examining correlations, interactions, or other relationships among attributes within the CRE.

In some embodiments, the compatibility engine computes a weighted combination of cross-attribute correlations derived from the CRE. For example, the engine may analyze feature interactions within the CRE, including interactions that result from the aggregation of entity vectors or from residual pairwise terms present in the CRE. In some embodiments, the compatibility engine applies one or more weighting parameters to emphasize or attenuate particular attributes, attribute pairs, or relational signals. The weighting parameters may be learned, static, or determined according to governance-related rules.

In some embodiments, the compatibility score is computed using a projection function applied to the CRE. The projection function may be linear or may involve a nonlinear mapping such as a kernel-based transformation. In some embodiments, the projection function operates over the feature components of the CRE to produce a scalar score. In some embodiments, the projection function may be parameterized by a weight vector W and an offset term b, which may be trainable or governed by constraints related to interpretability, trust, or usage policies.

In some embodiments, the operation of the comparison module is represented by an equation. An example equation for computing a compatibility score $\hat{S}$ is shown below:

$$\hat{S} = \sigma(CRE \cdot W + b)$$

In this example, W is a weight vector and the term b represents a bias or offset that may adjust the projection. The term $\sigma$ is a function. In some embodiments, $\sigma$ is a bounded activation function, such as a sigmoid, which is used to map the projected value to a normalized score. In some embodiments, other activation functions are used, including linear functions, rectified functions, or domain-specific bounded mappings. In some embodiments, W and b are updated during adaptive feedback cycles based on observed prediction performance or other evaluation criteria.

In some embodiments, each CRE is be associated with one or more interpretability vectors. An interpretability vector comprises a set of interpretability metrics, with each metric corresponding to a specific attribute of an entity of which the CRE represents. These metrics quantify the relative influence of individual attributes on the composite outcome. For a given attribute $f_k$ in a CRE, an interpretability metric may be calculated. An example equation is:

$$\psi_k = \partial C / \partial f_k$$

Wherein $\psi_k$ is the interpretability metric associated with the attribute $f_k$, and C is the compatibility, prediction, or objective function. Each interpretability metric Vx measures the sensitivity of C to changes in $f_k$, providing a gradient-like indication of that attribute's contribution to the composite outcome. Collectively, the set of metrics {$\psi$k} forms an interpretability vector that provides insight into which attributes exert the greatest influence on the CRE. In some embodiments, the system is configured to explain the role of specific features in forming the CRE in human-readable terms. In some embodiments, interpretability vectors are stored with each CRE alongside governance metadata. The storage of interpretability vectors may enable evaluation, auditing, and explanation of each CRE.

In some embodiments, the compatibility score is computed using governance-weighted and trust-modulated comparison functions. In some embodiments, these functions utilize interpretability vectors included within the CRE to identify salient relational dimensions and to modulate the comparison. Governance rules may influence weighting schemes, permissible comparisons, or emphasis applied to specific relational factors. In some embodiments, the system expresses compatibility operationally.

In some embodiments, the compatibility between two CREs is evaluated through the generation of a compatibility score. An example equation for the generation of the compatibility score is:

$$C_{ij} = (CRE_i \cdot CRE_j) / (\|CRE_i\| \cdot \|CRE_j\|)$$

Wherein $C_{ij}$ is the compatibility score between CREs i and j, $CRE_i$ is the vector representation of the i-th CRE, $CRE_j$ is the vector representation of the j-th CRE, and $\|CRE_i\|$ and $\|CRE_j\|$ represent the vector magnitudes of $CRE_i$ and $CRE_j$. In some embodiments, the comparison module is configured to evaluate relational compatibility of two or more CREs. In some embodiments, the compatibility score is a numerical representation of the compatibility between two or more CREs. In some embodiments, the comparison module is configured to generate a compatibility score for two or more CREs. In some embodiments, compatibility scoring between two CREs is only performed when governance conditions are satisfied. For example, a first CRE may only be evaluated for compatibility with a second CRE, and a compatibility score generated, if the governance metadata of both the first CRE and the second CRE meet governance threshold rules. There may be a trust coefficient threshold value that the trust coefficients from both CREs must be greater than for compatibility evaluation between the two CREs and inter-CRE compatibility score generation.

In some embodiments, compatibility scores are stored, logged, or retained. In some embodiments, the compatibility scores are monitored for prediction quality. For example, the system may compare compatibility scores generated at different times, under different conditions, or across different engines. In some embodiments, monitoring of the scores is done to evaluate stability or detect drift. In some embodiments, stored compatibility scores influence updates to trainable parameters within a relational synthesis engine. In some embodiments, compatibility scores influence updates to trust coefficients or weigh coefficients associated with contributing entities. In some embodiments, compatibility scores are associated with an audit token. In some embodiments, the audit token is used to indicate the conditions under which the score was produced.

In some embodiments, a system described herein is configured to compare predicted compatibility scores with feedback. In some embodiments, comparison of predicted compatibility scores with feedback is contingent on validation of the CRE. In some embodiments, feedback is captured by a feedback module. In some embodiments, the feedback is observed outcomes. In some embodiments, observed outcomes includes measurable indicators of entity interaction quality, such as engagement metrics, satisfaction responses, behavioral follow-through, or other domain-specific signals. In some embodiments, each observed outcome is associated with a particular CRE or group of entities. In some embodiments, the feedback is associated with at least one entity associated with a particular CRE or which is represented by a CRE. In some embodiments, the feedback module is configured to receive feedback or observed outcomes collected from a different source. In some embodiments, the system comprises an interactive interface configured to collect feedback. In some embodiments, the system is configured to compare observed outcomes related to a CRE and the generated compatibility score of the CRE. In some embodiments, a feedback module is configured to make this comparison. In some embodiments, a governance-weighted update module is configured to make this comparison. In some embodiments, comparing the outcomes related to a CRE and the generated compatibility score of the CRE comprises generating a residual deviation representing the differences between the generated compatibility score and the observed outcome.

In some embodiments, the residual deviation for a given CRE is expressed as $\Delta_{(ij)}$, where $\Delta_{(ij)}$ represents the discrepancy between the predicted score and the corresponding observed outcome for entities i and j. The residual deviation may be positive, negative, or zero depending on whether the predicted compatibility overestimates, underestimates, or aligns with observed behavior. In some embodiments, the residual deviation is used as a signal indicating how the system should adjust one or more synthesis parameters to improve predictive accuracy.

In some embodiments, the system processes residual deviations to update one or more parameters of the CRE. In some embodiments, the system uses residual deviations to update one or more parameters associated with the generation or regeneration of the CRE. In some embodiments, these parameters are used in the generation or regeneration of a CRE using a separate system architecture. The trainable parameters may include aggregation weights, governance coefficients, interaction coefficients, interpretability vectors, or other parameters. In some embodiments, updates to the parameters are performed using an adaptive, gradient-based routine that evaluates the impact of each parameter on the residual deviation. The updates may occur continuously, periodically, or in response to event-triggered conditions.

In some embodiments, an update routine for adjusting a parameter set is expressed using an equation. An example equation is:

$$\Theta(t + 1) = \Theta(t) + \eta \cdot \nabla \Theta L(\Delta_{(ij)})$$

In this example, $\Theta(t)$ represents the current value of the parameter set at time t, and $\Theta(t+1)$ represents the updated parameter set. The term n denotes a learning-rate coefficient, which may be fixed, dynamically adjusted, or governed by domain-specific rules. The term L represents a loss function, and $\nabla \Theta L$ is a gradient of the loss function. In some embodiments, different loss functions are used depending on domain requirements. $\Delta_{(ij)}$ is a residual deviation and represents the discrepancy between the predicted score and the corresponding observed outcome for entities i and j.

In some embodiments, updating the parameters is done continuously, and in some embodiments it is done in isolation. For example, parameter updates may be performed without requiring full-model retraining or global recomputation of all CREs. In some embodiments, updates are confined to parameters that directly influence the CREs or compatibility scores related to the observed outcomes. In some embodiments, the update process is influenced by governance, trust-weight, or audit tokens. For instance, in some embodiments a parameter update is not initiated unless the CRE for the parameter update comprises an audit token.

In some embodiments, the system modulates residual deviations based on a governance-based update rule. In some embodiments, the system modulates residual deviations based on trust coefficients. In some embodiments, each relational group of entities in a CRE is assigned a trust coefficient. In some embodiments, the trust coefficient may represent a reliability measure, confidence estimate, provenance quality indicator, or domain-governance score associated with the entities. In some embodiments, the trust coefficient is determined by rules, learned parameters, audit conditions, or any combination thereof.

In some embodiments, trust coefficients are incorporated into the feedback process to adjust the influence of each observed residual deviation on subsequent parameter updates. In some embodiments, trust coefficients are generated for each measured observation. In some embodiments, trust coefficients are generated for each entity profile associated with each entity. In some embodiments, a trust coefficient generated for an entity profile carries over to each measured observation sourced from the entity associated with the entity profile. For example, observations considered reliable, may receive high trust coefficients, while observations considered less reliable may receive lower trust coefficients. Reliability may be determined by whether the observation comprises a verified provenance, whether the observation is consistent with historical behavior, or whether the observation comprises an authenticated audit token. In some embodiments, trust coefficients dampen or enhance the contribution of observations to parameter updates.

In some embodiments, the system computes a trust-weighted residual deviation. An example could be:

$$R'(t) = \sum\nolimits_{k} \tau\_\text{trust}(i_k, j_k) \cdot [\text{S\_obs}(i_k, j_k) - \text{S\_pred}(i_k, j_k)]$$

In this example, $\text{S\_obs}(i_k, j_k)$ represents the observed outcome associated with the relational pair $(i_k, j_k)$, and $\text{S\_pred}(i_k, j_k)$ represents the predicted compatibility score for the same pair. The difference between these values represents a residual deviation, and the corresponding trust coefficient $\tau\_\text{trust}(i_k, j_k)$ scales this deviation. In some embodiments, the updated residual $R'(t)$ may serve as an input to the gradient-based update routine described herein.

In some embodiments, systems, methods, and media described herein are configured to generate a CRE delta. In some embodiments, a CRE delta represents a difference between the updated one or more parameters of a CRE and the one or more parameters of the CRE.

In some embodiments, a system described herein is configured to propagate a CRE delta. In some embodiments, propagating a CRE delta comprises transmitting, communicating, or otherwise making available a CRE delta of a CRE from one system component, processing domain, or computing environment to another. In some embodiments, the system is configured to propagate CRE deltas rather than transmitting full CRE states.

In some embodiments, the propagation of CRE parameters of CRE deltas is controlled by strict requirements. In some embodiments, CRE parameters or CRE deltas are propagated only when governance metadata satisfies a predetermined governance threshold. In some embodiments, a propagation module is configured to determine whether a CRE is eligible for propagation. In some embodiments, a CRE that is not eligible for propagation can have no CRE deltas or CRE parameters propagated.

In some embodiments, propagation of CRE deltas comprises aggregating CRE deltas into a synchronized delta state. In some embodiments, the CRE deltas are from different domains and then aggregated into a synchronized delta state. In some embodiments, each CRE delta is scaled according to governance constraints, trust signals, or provenance metrics that influence its relative contribution to the aggregated delta. In some embodiments, each CRE delta contributed by a domain is scaled according to domain-level coefficients. In some embodiments, a synchronization engine computes the aggregated delta by combining domain-specific CRE deltas using influence weights analogous to the domain-level coefficients described herein for parameter synchronization. In some embodiments, CRE parameters are updated based on the synchronized delta state. For instance, a CRE may update its local parameters based on the synchronized delta state. In some embodiments, the degree the synchronized delta state updates the local CRE parameters is influenced by a domain influence coefficient specific to the domain of the CRE.

In some embodiments, a system described herein may include multiple engines or nodes operating in different domains. Each engine may maintain its own set of parameters. These parameters may govern CRE synthesis, compatibility scoring, or feedback-based adaptations occurring within that domain. In some embodiments, each engine may update trainable parameters independently using domain-specific observations, residual deviations, and trust-weighted corrections as described herein. In some embodiments, each system may update its parameters based on a governance modulated residual deviation.

In some embodiments, the system is configured to maintain coherence among the distributed engines. In some embodiments, relational knowledge learned in one domain can inform the behavior of other domains. In some embodiments, parameter updates from one CRE influence the parameters of other CREs. In some embodiments, the process of parameter updates influence other CREs is referred to as synchronization. In some embodiments, the system comprises a synchronization engine which is a communication channel through which engines exchange partial parameter updates or summaries thereof. In some embodiments, these exchanges occur asynchronously, periodically, or in response to defined system conditions.

In some embodiments, the synchronization engine aggregates parameter updates received from multiple engines to produce shared or synchronized parameter values. In some embodiments, the system may combine parameters from each domain according to a domain-level coefficient. A domain-level coefficient may describe the relative importance, influence, or reliability of each domain's contribution. For example, CREs may be domain specific and the sharing of parameter deltas or parameters from each CRE in synchronization is impacted by domain-level coefficients specific to each domain. In some embodiments, cross-domain parameter aggregation is performed using a weighted combination of domain-specific parameter sets. An example equation is:

$$\Theta\_global = \sum\_d \omega\_d \cdot \Theta\_d$$

In this example, $\Theta\_global$ represents an aggregated parameter derived from parameters $\Theta$ across multiple domains d. The weights w, determine the relative contribution of each domain. This weight may be based on domain reliability, domain size, governance rules, or other rules. In some embodiments, $\Theta\_global$ may be used to guide synchronized updates across engines, or may serve as a reference parameter state for individual engines.

In some embodiments, individual engines may adjust their domain-specific parameters according to differences between their parameters and an aggregated parameter. For example, the adjustment may be expressed as this equation:

$$\Theta'\_d = \Theta\_d + \omega\_d(\Theta^- - \Theta\_d)$$

In this example, $\Theta'\_d$ represents an updated parameter for domain d. $\Theta^-$ is an aggregated parameter. $\omega\_d$ is a domain influence coefficient which may scale the extent to which a domain adopts the changes from other domains. A larger value of $\omega\_d$ may indicate that domain d is more strongly influenced by the aggregated state, whereas a smaller value may indicate greater autonomy or reduced cross-domain coupling.

In some embodiments, cross-domain parameter aggregation may incorporate trust coefficients associated with each domain. A trust coefficient may represent the reliability, provenance quality, governance compliance, or historical performance of a domain. In some embodiments, domains with higher trust coefficients may exert greater influence on aggregated parameter states, whereas domains with lower trust coefficients may exert reduced influence.

An example of the influence of trust on parameter updates can be shown in this equation:

$$\Theta\_synced = \sum\_d \tau\_d \cdot \Theta\_d / \sum\_d \tau\_d$$

In this example, $\Theta\_d \, \tau\_d \cdot \Theta\_d$ represents the sum of each domain's parameter set $\Theta\_d$ scaled by its corresponding trust coefficient $\tau\_d$, indicating each domain's weighted contribution. $\tau\_d$ represents the trust coefficient assigned to domain d, reflecting the reliability, governance compliance, or confidence level associated with that domain's parameter updates. $\Sigma\_d \, \tau\_d$ represents the total trust weight across all of the participating domains. $\Theta\_synced$ is the aggregated parameter incorporating trust weighting. In some embodiments, $\Theta\_synced$ can serve as the aggregated parameter $\Theta^-$ for alignment of parameters in specific domains as described herein.

In some embodiments, the trust-weighted parameter state $\Theta\_synced$ is transmitted by the synchronization engine to one or more engines. Each engine may incorporate $\Theta\_synced$ into its parameter updates. Incorporation may be governed by policies, usage-rights constraints, governance rules, or audit-token requirements. In some embodiments, this parameter synchronization method enables alignment of engine parameters without the transmission of raw source data.

In some embodiments, a system described herein may transform internal model activity into human-readable insights. In some embodiments, the system comprises an interpretability layer configured to transform internal model activity into human-readable insights. In some embodiments, the interpretability layer is configured to operate on compatibility scores, residual deviations, or other internal representations generated by the system. In some embodiments, the interpretability layer is configured to identify features, interactions, or relational patterns that most significantly contribute to a particular compatibility outcome or decision. In some embodiments, the interpretability layer is configured to facilitate auditability, transparency, or explainability for system users, administrators, or external auditors.

In some embodiments, the interpretability layer evaluates the influence of each entity feature or CRE component on a compatibility score. For example, the layer may measure the sensitivity of a predicted score with respect to changes in individual entity vectors or attributes. In some embodiments, the resulting values may be normalized to produce feature-importance weights, which may provide a relative ranking of the contributions of different features or interactions.

In some embodiments, the operation of the interpretability layer is represented by an equation. An example equation for generating normalized feature-importance weights V (e.g. an interpretability vector) is shown below:

$$\psi_k = \left| \partial \hat{S} / \partial E_k \right| \Big/ \sum_k \left| \partial \hat{S} / \partial E_k \right|$$

In this example, $\partial \hat{S}/\partial E_k$ denotes the partial derivative of the compatibility score $\hat{S}$ with respect to the k-th feature or entity vector $E_k$. The absolute value $|\partial \hat{S}/\partial E_k|$ represents the magnitude of the contribution of feature k. The denominator $\tau_k |\partial \hat{S}/\partial E_k|$ represents the sum of absolute contributions across all features. In some embodiments, $\psi_k$ is used to rank features, highlight influential relational patterns, or inform further model adjustments. In some embodiments, human-readable insights are generated by mapping Vx values to descriptive outputs, such as textual explanations, visualizations, or charts, that identify the features or interactions most responsible for a compatibility prediction.

In some embodiments, the interpretability layer is configured to show importance weights, explanations, or visualizations through an API. The API may generate textual, graphical, or programmatic outputs that describe the contributions of individual features, pairwise interactions or higher-order relational patterns. In some embodiments, the outputs from the interpretability layer are associated with an audit token, provenance records, or governance metadata. The association of the outputs may allow the outputs to be traced and reproduced.

In some embodiments, the interpretability layer is configured to operate continuously. In some embodiments, the interpretability layer is configured to operate on-demand. For example, feature-importance weights may be recalculated each time a CRE is updated/re-generated, a compatibility score is computed, or residual deviations are observed. In some embodiments, the outputs of the interpretability layer are optionally used to refine model parameters, adjust trust coefficients, or provide feedback to be used in the generation of residual deviations, thereby allowing interpretability signals to influence CRE updating or parameter updates. In some embodiments, the interpretability layer instead serves purely as a reporting or monitoring layer that provides human-readable insights without directly modifying model parameters.

In some embodiments, entity profiles are validated. In some embodiments, validation includes checks for completeness, accuracy, consistency, or conformance with a predefined schema. For example, missing or out-of-range attributes may be flagged, corrected, or assigned default values. In some embodiments, entity profiles failing validation may be excluded from subsequent CRE synthesis, temporarily quarantined for review, or processed with reduced trust coefficients. In some embodiments, validation includes verification of source authenticity, ensuring that input data originates from authorized or trusted sources. In some embodiments, validated entity profiles are normalized, encoded, or otherwise transformed into vectorized representations suitable for aggregation and compatibility evaluation.

In some embodiments, the system proceeds through a sequence of stages that are executed in repeated cycles across distributed nodes. In some embodiments, each stage contributes to a closed-loop process that continuously synthesizes, evaluates, refines, and synchronizes CREs. In some embodiments, each cycle of the system may update the global model parameters. In some embodiments, each cycle of the system distributes improvements to parameters across one or more connected domains. In some embodiments, the sequence of stages may include entity intake, relational synthesis, compatibility evaluation, feedback adaptation, and cross-domain synchronization. In some embodiments, the iterative execution of these stages may enable continuous adaptation of CREs, aggregation parameters, trust coefficients, or other trainable model components, without requiring complete model retraining or centralization of raw source data.

In some embodiments, the system is configured to process entity data in a manner that preserves privacy and prevents exposure of sensitive information. In some embodiments, entity information is anonymized. In some embodiments, the entity information is anonymized prior to integration into a CRE. For example, identifying attributes may be removed, masked, or transformed prior to the creation of a CRE.

In some embodiments, the system applies differential-privacy techniques during parameter updates. For example, noise may be injected into parameter gradients, residual terms, or other update values to reduce the likelihood that any individual entity can be determined from these metrics. In some embodiments, the magnitude of the injected noise may be varied according to one or more inputs. In some embodiments, the distribution of the injected noise is varied according to one or more inputs. In some embodiments, the magnitude or distribution of the injected noise may be varied according to privacy policies, trust coefficients, or domain-specific requirements.

In some embodiments, communications among nodes, engines, or domains are encrypted. For example, the system may employ encryption protocols to any transmitted information including parameters updates, aggregated parameters, or trust-weighted update values transmitted across the network. In some embodiments, encryption may occur in transit, at rest, or both.

In some embodiments, only aggregated model information is exchanged across domains. For example, each domain may transmit aggregate weight updates, trust-adjusted parameters, or summary statistics derived from local learning, rather than any raw entity data. This configuration ensures that no personally identifiable or sensitive information leaves the environment in which the entity profile originated.

In some embodiments, the system comprises a governance layer. In some embodiments, the governance layer is configured to enforce license requirements or authorization conditions for communication among engines or nodes. In some embodiments, each exchange of parameters, updates, or other information between engines or nodes requires the presence of a valid usage token. In some embodiments, the usage token is a renewable token issued by an authorization authority. In some embodiments, each token is bound to one or more hardware-attested device identifiers. In some embodiments, each token is validated within a Trusted Execution Environment (TEE) prior to the decryption of any transmitted information or prior to the acceptance of any parameter updates.

In some embodiments, a node that lacks a valid or current usage token is prevented from transmitting or receiving parameter updates. For example, a node with an expired or unverified token may lose the ability to participate in cross-domain synchronization.

In some embodiments, information transmitted across domains incorporates structural identifiers or watermark patterns. In some embodiments, this information includes parameter updates, aggregated parameters, parameter deltas, or CRE information. For example, a parameter delta may be associated with a watermark pattern that is configured to be detectable by correlation analysis. In some embodiments, the system is configured to use the one or more patterns or watermarks to trace the origin of the CREs and parameter deltas. In some embodiments, the system is configured to detect whether transmitted parameter updates or CREs originated from a node comprising a usage token. In some embodiments, this detection is through structural identifiers or watermark patterns. In some embodiments, the governance layer is configured to use structural identifiers or watermark patterns to verify that transmitted parameter updates or CREs originate from a node comprising a usage token.

In some embodiments, the system may configure certain nodes to host synthetic CREs or inert relational structures associated with their entity profiles. These synthetic CREs may be used to monitor the sharing of CREs and parameter updates across the network, verify correct update handling, and detect anomalous behavior. The system may automatically generate audit entries and alerts if synthetic CREs appear in unauthorized contexts, enabling traceable enforcement of governance rules.

In some embodiments, governance-related events are recorded in an audit registry or ledger. An audit registry may store usage token validations, trust-weighted parameter exchanges, watermark verification events, or any governance metadata. Each entry may include a timestamp, a node identifier, a usage token reference, and a hash representing evidentiary information. In some embodiments, this registry may operate as a verifiable log.

In some embodiments, the systems, methods, and media described herein are applied to a wide range of environments requiring the synthesis, evaluation, or coordination of relational information. Although social-matching and professional-matching applications provide illustrative examples, in some embodiments, the systems, methods, and media described herein are deployed in commercial or operational domains such as supply-chain coordination, logistics planning, vendor-client matching, inventory optimization, and procurement networks. In some embodiments, the systems, methods, and media described herein are applied to healthcare environments, including triage routing, care-team assignment, therapy-plan matching, or patient-resource coordination. In some embodiments, the systems, methods, and media described herein may support robotics or automation contexts, including human-robot teaming, cooperative-robot task allocation, swarm-robot coordination, or safety-aware interaction planning. In some embodiments, the systems, methods, and media described herein are utilized in education or training environments, including adaptive learning systems, personalized curriculum sequencing, or student-instructor pairing. In some embodiments, the systems, methods, and media described herein may operate within simulation or computational modeling domains, including multi-agent simulation networks, reinforcement-learning environments, digital-twin ecosystems, or hybrid human-machine decision-support systems. The systems, methods, and media described herein may be applied to any environment in which two or more entities, agents, or resources may be evaluated, coordinated, or synthesized to form relational representations.

Computational Efficiency

Systems, methods, and media disclosed herein generate and utilize composite relational entities (CREs). Each CRE represents the relationships among multiple entities in a single compact form. By encoding multi-entity relationships in this manner, the system reduces the amount of computation required, since it is not necessary to perform separate calculations for each group of two or more entities. The CREs also reduce the size of the data that must be transmitted or stored, thereby lowering bandwidth and memory requirements. In some embodiments, learning or parameter updates are performed locally within each CRE, which reduces the frequency of global synchronization (e.g., the coordinated updating or averaging of parameters across all CREs or system nodes). In addition, feedback from the system may be applied asynchronously, allowing computations to be performed in parallel and increasing the efficiency of hardware utilization. In some embodiments, this structure supports selective transmission, where only a portion of each CRE's parameters is sent across the network, while the remainder can be reconstructed deterministically at the receiving node.

In some embodiments, the system transmits only the changes or updates to parameters (parameter deltas), rather than transmitting entire datasets when the system performs adaptive synchronization. By limiting the communication to deltas, the system reduces the amount of data that must be sent between components, conserving bandwidth. In addition, this approach reduces the computational load on processing units, since less data must be handled and integrated. In some embodiments, the system is configured to combine delta transmission with selective transmission of only certain matrix columns or CRE portions. In some embodiments, the timing of delta transmission may be updated based on system requirements or network conditions, allowing for further optimization of resource usage.

In some embodiments, the system employs structured re-use of a latent relational embedding within a CRE, allowing compatibility computations to be performed in $O(n)$ rather than $O(n^2)$ complexity relative to the number of participating entities. Such embedding reuse improves runtime scalability and reduces computational overhead across distributed nodes. In some embodiments, the CREs may be partitioned or clustered according to entity similarity or interaction frequency, further optimizing memory locality and enabling parallelized operations. Moreover, the re-use of latent relational structures allows incremental updates to propagate within each CRE without necessitating full recomputation. In some embodiments, the system may dynamically adjust CRE composition based on observed interaction patterns, ensuring that computational and communication resources are allocated efficiently.

The embedding of governance and interpretability within the learning process may further improve efficiency. For instance, it can eliminate redundant aggregation, prevent unauthorized updates, and enable selective propagation of parameter changes.

FIG. 1 is an example system architecture including incoming CRE streams from one or more engines 101-103, governance-modulated compatibility scoring 110, nonlinear and kernelized multi-CRE aggregation 120, cross-domain synchronization logic 130, delta-only propagation 140, coordination layer performing governance filtering 151, trust-coefficient modulation 152, audit validation 153, and domain-wall enforcement 154, and lifecycle-aware interpretability outputs 155. The system is configured to take the incoming CRE streams 101-103 and using governance-modulated compatibility scoring 110 generate compatibility scores for each CRE, wherein each compatibility score represents compatibility between the two or more entities each CRE represents. The system also combines multiple CREs together into a new composite. This is done through kernelized/non-linear aggregation 120 thus capturing non-linear relationships among CRE features. The system engages in cross-domain synchronization logic 130 where updates to CRE generation parameters, CRE related parameters, or combined CRE parameters from different domains are aggregated and then used to influence local parameter adjustments for each domain. The cross-domain synchronization logic 130 uses domain-level coefficients that describe the relative importance, influence, or reliability of each domain's contributions and can influence the aggregation of the parameters. Other governance or trust coefficients associated with CREs, nodes, or entities influence the creation of the parameter updates and the later parameter aggregation. The system engages in delta-only propagation 140 where instead of transferring full parameters, the system transfers only parameter differences when performing the aggregation of parameters in the cross-domain synchronization. The parameter differences are bound with the associated governance metadata and lineage anchors/audit tokens from where the parameters are sourced. The system further engages in governance filtering 151 wherein parameter deltas that only have verifiable governance metadata are able to be involved in synchronization/aggregation and thus have an impact on the local parameter updates, trust coefficient modulation 152 where the trust coefficients from each CRE influence the degree which parameter deltas sources from that CRE have influence on the parameter aggregation, audit signature verification 153 where an audit signature from each CRE is verified prior to the integration of the parameter deltas from that CRE into the aggregation of parameter deltas in the cross-domain synchronization, and domain authority enforcement 154 where the system applies domain-bound constrains to each parameter or parameter delta which prevent unauthorized cross-domain transfer of parameters or parameter deltas. The system employs an adaptive feedback loop 160 where feedback captured from observed outcomes influence parameter updates, for example compatibility scores for individual CREs can be compared to feedback and that resulting comparison may be influence updates to the parameters of each CRE, these updates to the parameters can then be used in cross-domain synchronization. Finally, the system comprises an interpretability vector output 170 which generates interpretability outputs which describe which relational factors, governance weights, or trust coefficient adjustment contributed to a particular compatibility outcome. These can be tied to specific compatibility scores and show which factors had the greatest influence in generating the score.

FIG. 2 is a flow diagram of a cross-domain propagation sequence in the system, showing CREs entering the coordination layer 210 with persistent identity and lineage anchors, undergoing governance-threshold validation 220, delta extraction 230, and audit signature verification 240, and domain-bounded synchronization 260. First CREs enter the coordination layer 210 and are subject to governance-threshold validation 220. CREs are evaluated for governance level and are rejected if they are found to be below a required governance level. Then, parameter deltas, which are the set of changes derived from updates to the CREs, are extracted from the CREs 230. The CREs then undergo audit signature verification 240 where the lineage anchor and audit signature of the CREs are verified to ensure proper lineage continuity of the CREs and proper authenticity of the CREs. Then the CREs is put through governance filtering 251, where the governance metadata of the CREs is evaluated to determine whether the parameter deltas of the CREs are permitted to be used in parameter synchronization. The trust coefficients associated with each CRE modulate the degree the parameter deltas from each CRE may influence the parameter synchronization through trust coefficient modulation 252. Lineage verification 253 is done to ensure that each CRE has the proper lineage anchor. Domain-wall enforcement 254 ensures that no parameter deltas, CRE parameters, or CRE states can cross from one domain to another unless they are used in an authorized, validated synchronization process. Domain bound synchronization 260 then process where parameter deltas from each CRE are aggregated according to governance rules and the resulting aggregate is then used to influence local parameter updates for each CRE. Finally, feedback is collected from entities which the CREs represent further informing future parameter updates though lifecycle feedback 270.

Figure 3:
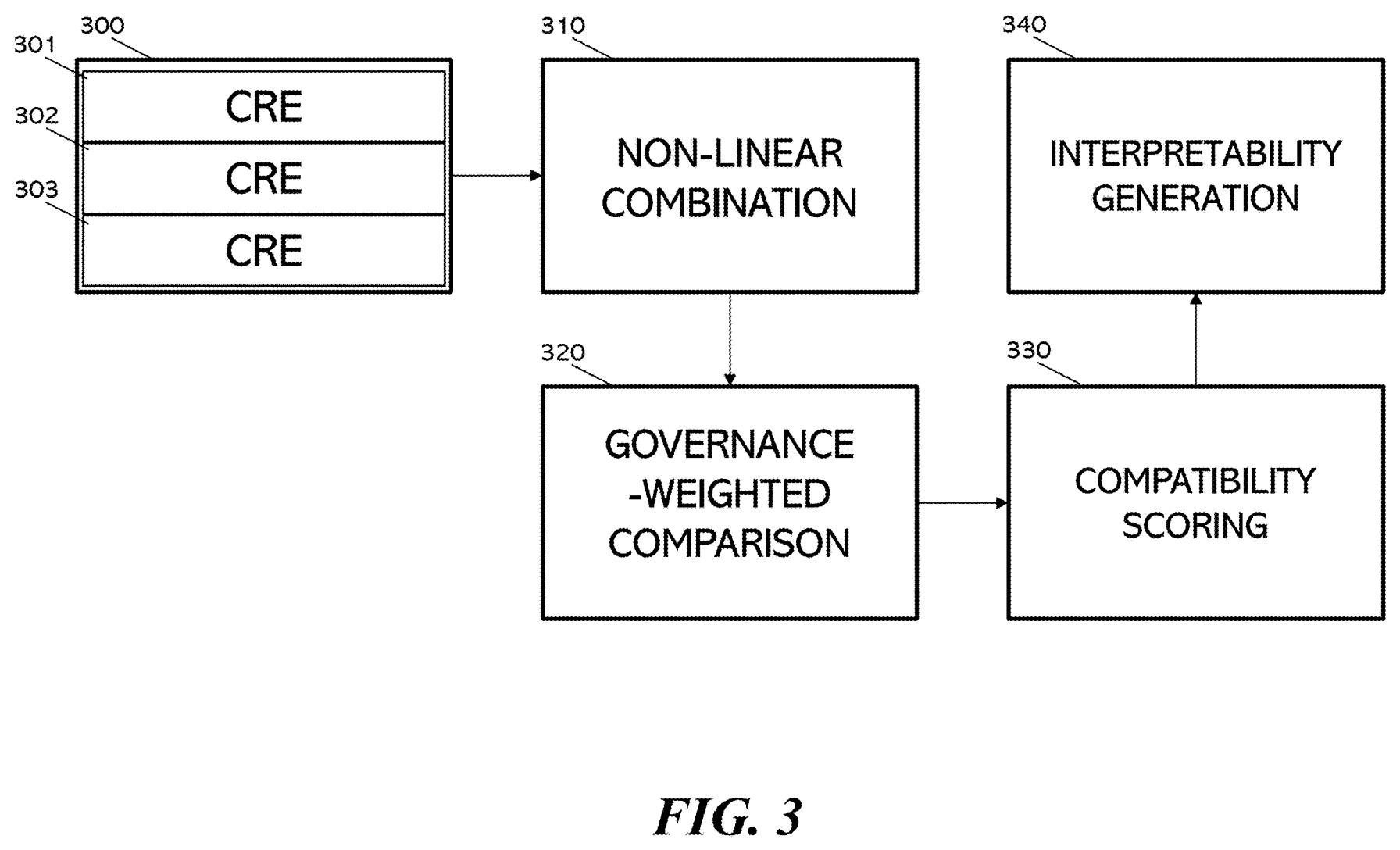

FIG. 3 illustrates an example compatibility and aggregation flow in which multiple CREs 300 undergo non-linear combination 310, governance-weighted comparison 320, compatibility scoring 330, and lifecycle-aware interpretability generation 340.

Continuing to refer to FIG. 3, multiple CREs 300 first undergo non-linear combination 310. This involves applying kernelized, non-additive, or other non-linear operators to aggregate features of the multiple CREs 300. This produces a composite multi-CRE structure. Following the non-linear combination 310 the composite CRE undergoes governance-weighted comparison 320. In this stage, comparison functions are weighted according to governance metadata associated with each CRE including trust coefficients and policy restraints. This comparison is then used for compatibility scoring 330, generating a compatibility score for the composite multi-CRE structure. In this process, the contribution of each CRE to the overall compatibility score is modulated by governance weights. Once the compatibility score is generated, an interpretability vector for the composite multi-CRE structure is produced through lifecycle-aware interpretability generation 340. Each of the multiple CREs 300 comprises an interpretability vector of each interpretability metric for each attribute from the two or more entities each CRE represents, thereby providing insight into the level each attribute influenced the overall CRE. These interpretability vectors are in-turn used to generate an interpretability vector for the composite multi-CRE structure, wherein this interpretability vector provides the how much influence each CRE had on the formation of the composite multi-CRE structure. In some embodiments, the composite interpretability vector comprises a hierarchical vector-of-vectors structure that retains the individual interpretability vectors of each constituent CRE. In some embodiments, the composite interpretability vector is generated as a single aggregated vector derived from the individual interpretability vectors of the constituent CREs. The interpretability vector also provides human readable insights into how the compatibility score was generated.

Figure 4:
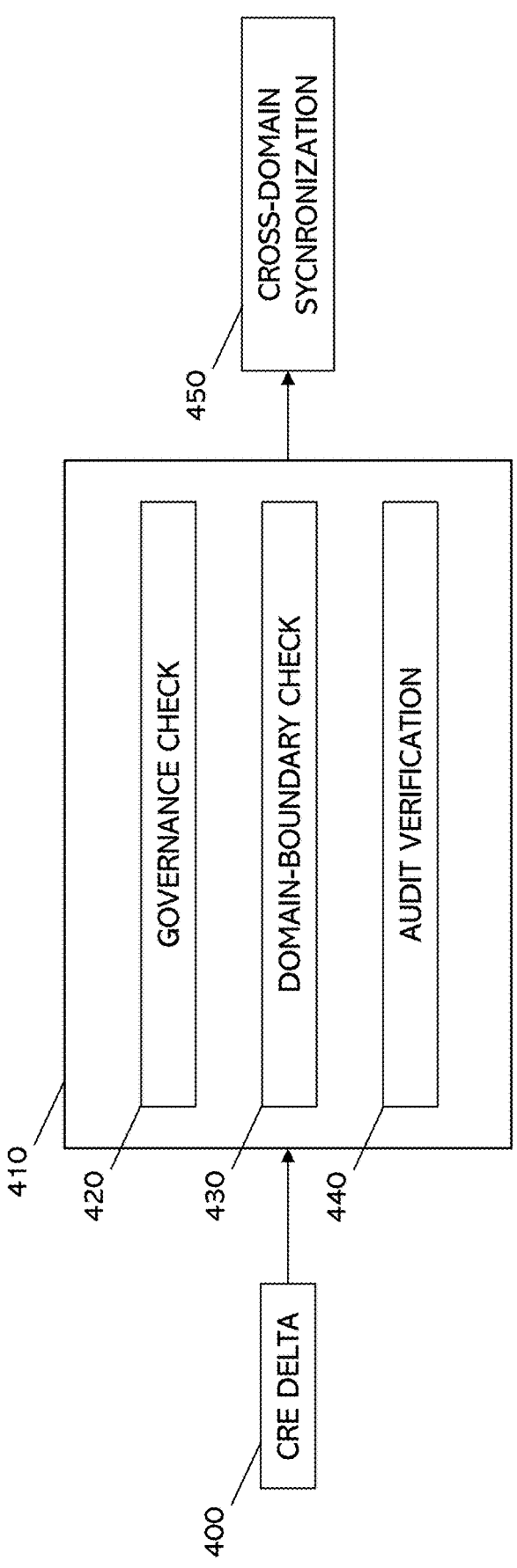
FIG. 4 depicts an example governance-filtered propagation module.

FIG. 4 illustrates an example governance-filtered propagation module 410 showing delta-only propagation, governance gating, domain-boundary checks, and audit verification, followed by coordinated cross-domain synchronization.

Referring to FIG. 4, a CRE delta 400 enters a governance-filtered propagation module 410. The CRE delta 400 represents a change or update to an existing CRE. The governance-filter propagation module 410 performs a governance check 420 on the CRE delta which involves comparing the governance metadata contained in the CRE delta 400 with reference governance rules stored in the system. This comparison may include whether the CRE delta's attributes comply with access control policies, whether the trust coefficient of the CRE delta 400 meets a minimum threshold, or whether a lineage anchor associated with the CRE delta 400 matches a reference lineage anchor. For example, access control policies can be where the CRE delta's attributes are evaluated based on role-based or attribute based permissions. If the CRE delta 400 fails the governance check 420 then the governance-filtered propagation module 410 will not propagate the CRE delta 400. After, the governance check 420 the governance-filtered propagation module 410 performs a domain-boundary check 430. This involves determining whether the CRE delta 400 is authorized to propagate into the target domain, based on domain-specific rules or constraints. For example, the governance-filtered propagation module 410 may evaluate whether the CRE delta's attributes, lineage, or trust level are compatible with the access restrictions, security policies, or regulatory requirements of the target domain. If the CRE delta 400 violates any domain-boundary constraints, it is blocked from propagating beyond the originating domain. After the domain-boundary check 430 the governance-filtered propagation module 410 performs an audit verification 440. The audit verification 440 involves verifying that the CRE delta 400 is associated with a proper audit signature or audit token. This audit token may be associated with a lineage anchor or persistent identifier of the existing CRE. The audit token may comprise a cryptographic hash, which is used to ensure the authenticity of the CRE delta 400 by verifying that its content has not been altered since the hash was generated. Failure to pass the audit verification 440 results in denial of the propagation of the CRE delta 400. Finally, if the CRE delta 400 passes the governance check 420, domain-boundary check 430, and audit verification 440, the governance-filtered propagation module 410 performs cross-domain synchronization 450 (e.g. propagation) of the CRE delta 400.

Figure 5:
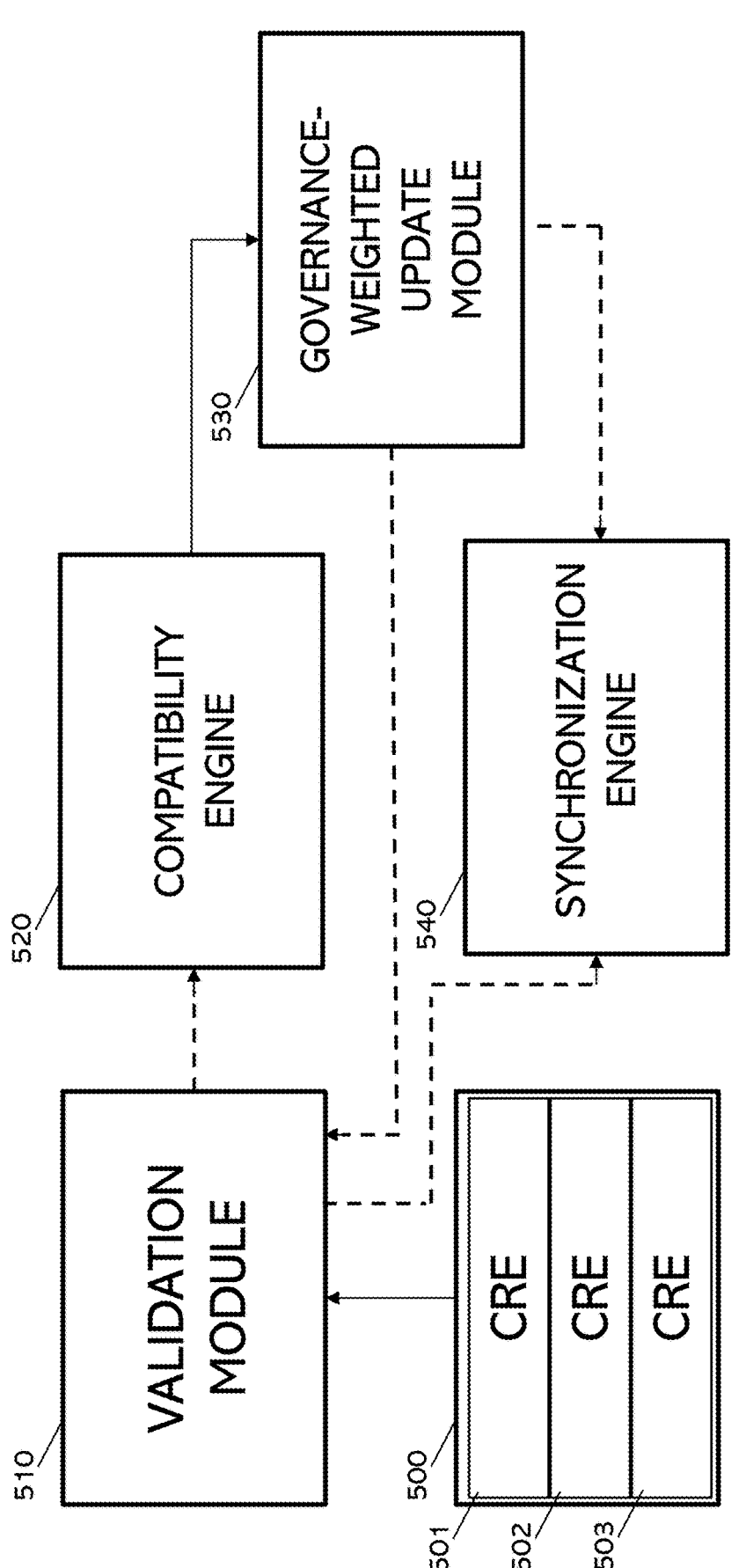
FIG. 5 depicts an example end-to-end cross-domain synchronization process.

FIG. 5 illustrates an example end-to-end cross-domain synchronization process, including CRE intake, validation of persistent identity and lineage anchors, governance-modulated delta propagation, domain-specific acceptance logic, and lifecycle-consistent CRE update pathways.

Referring to FIG. 5, a CRE intake module 500 receives multiple CREs 501-503 generated by an engine. The multiple CREs 501-503 then undergo validation by a validation module 510. This validation includes validating the governance metadata of each CRE by comparing the governance metadata of each CRE to reference governance rules. The validation also includes validating the persistent identifier of each CRE and the lineage anchor of each CRE against stored values. If a CRE meets successful validation, it is then processed by a compatibility engine 520. If a CRE is not successfully validated, it is rejected. The compatibility engine 520 then computes a compatibility score for each successfully validated CRE. The compatibility score is generated based on governance metadata, trust coefficients, and an interpretability vector included in the CRE. For example, if a CRE represents a relationship between multiple entities, attributes with higher trust coefficients and compliance with governance policies may increase the compatibility score, while conflicts between entity attributes identified by the interpretability vector (e.g. contradictory or low-confidence data), may reduce the score, resulting in a measure of compatibility between the entities. After the compatibility score is generated, a governance-weighted update module 530 updates one or more parameters of each successfully validated CRE. A parameter updated for a CRE is based on feedback associated with at least one entity the CRE represents. In some embodiments, the governance-weighted update module 530 quantifies the feedback. In some embodiments, the governance-weighted update module 530 computes a residual deviation between the compatibility score and the feedback. It then applies a governance-weighted update rule to modulate the residual deviation based on governance metadata and trust coefficients of the CRE. For example, if a CRE represents a relationship between two entities and feedback indicates that an attribute of the relationship should be stronger, the governance-weighted update module 530 may increase the corresponding parameter of the CRE, scaling the adjustment according to trust and governance metadata. Relationships or attributes that are associated with higher trust or stricter governance are scaled more heavily, meaning the residual deviation has a greater impact on their update, while relationships or attributes with lower trust or weaker governance receive smaller adjustments. After, updating the parameters, the governance-weighted update module 530 then generates CRE deltas for the updated CREs, wherein a CRE delta represents a difference between the updated one or more parameters and the one or more parameters of a CRE. A synchronization engine 540 then propagates the CRE deltas. In some embodiments, the validation module 510 performs a second validation prior to propagation of the CRE deltas. This second validation may include validating the persistent identifier, the lineage anchor, the governance metadata, and an audit signature of a CRE. After successful validation by the validation module 510, the synchronization engine 540 then propagates the CRE deltas of the CREs which passed the second validation. In some embodiments, it is not the CREs which are validated but the CRE deltas.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

The terms "entity" or "entities" as used herein can be any natural person, artificial person, organization, or construct. In some embodiments, an entity can include an individual, a corporation, a partnership, a trust, a governmental body, a non-governmental organization, a foundation, an academic institution, or any other public or private institution.

The term "feedback" as used herein refers to any data, signal, information, or indicator that reflects, represents or is derived from an outcome, response, interaction, or performance. In some embodiments, feedback can include explicit inputs, such as a rating provided directly by an entity. In some embodiments, feedback can include implicit or observed data derived from behaviors, transactions, communications, environmental conditions, or sensor outputs. Feedback may be qualitative or quantitative. In some embodiments, feedback can be automatically generated by a computational process, algorithm, or system. In some embodiments, feedback may be captured in real time, near real time, or asynchronously. Unless otherwise specified, the term "feedback" encompasses any form of information used to inform, train, adjust, evaluate, or refine one or more parameters, models, or processes described herein.

The term "parameter" or "parameters" as used herein refers to any value, variable, weight, coefficient, threshold, vector, setting, or other definable element that influences or determines the behavior, structure, or output of a model, engine, or computational process. In some embodiments, parameters can include numerical values, categorical indicators, probability distributions, or learned representations. In some embodiments, parameters are static, dynamic, predefined, or adaptively modified over time in response to feedback or other contextual inputs. Unless otherwise indicated, the term "parameter" is intended to be interpreted broadly to include any data element, control value, or learned variable used to configure, calibrate, or influence computational, analytical, or relational modeling operations described herein.

The term "domain" as used herein refers to any definable scope, context, category, or environment in which entities, data, or relational models operate, interact, or are evaluated. In some embodiments, a domain can include a subject-matter area, such as health, finance, professional relationships, transportation, hospitality, social relationships, commerce, or education.

The term "engine" as used herein refers to any computational, logical, algorithmic, or procedural component configured to perform one or more operations, functions, or analyses described herein. The term includes, without limitation, artificial intelligence models, machine learning models, neural networks, statistical models, or any adaptive or rule-based system configured to generate, process, or analyze data. Unless otherwise indicated, the term "engine" encompasses both trained models and dynamically learning systems.

Computing System

Figure 6:
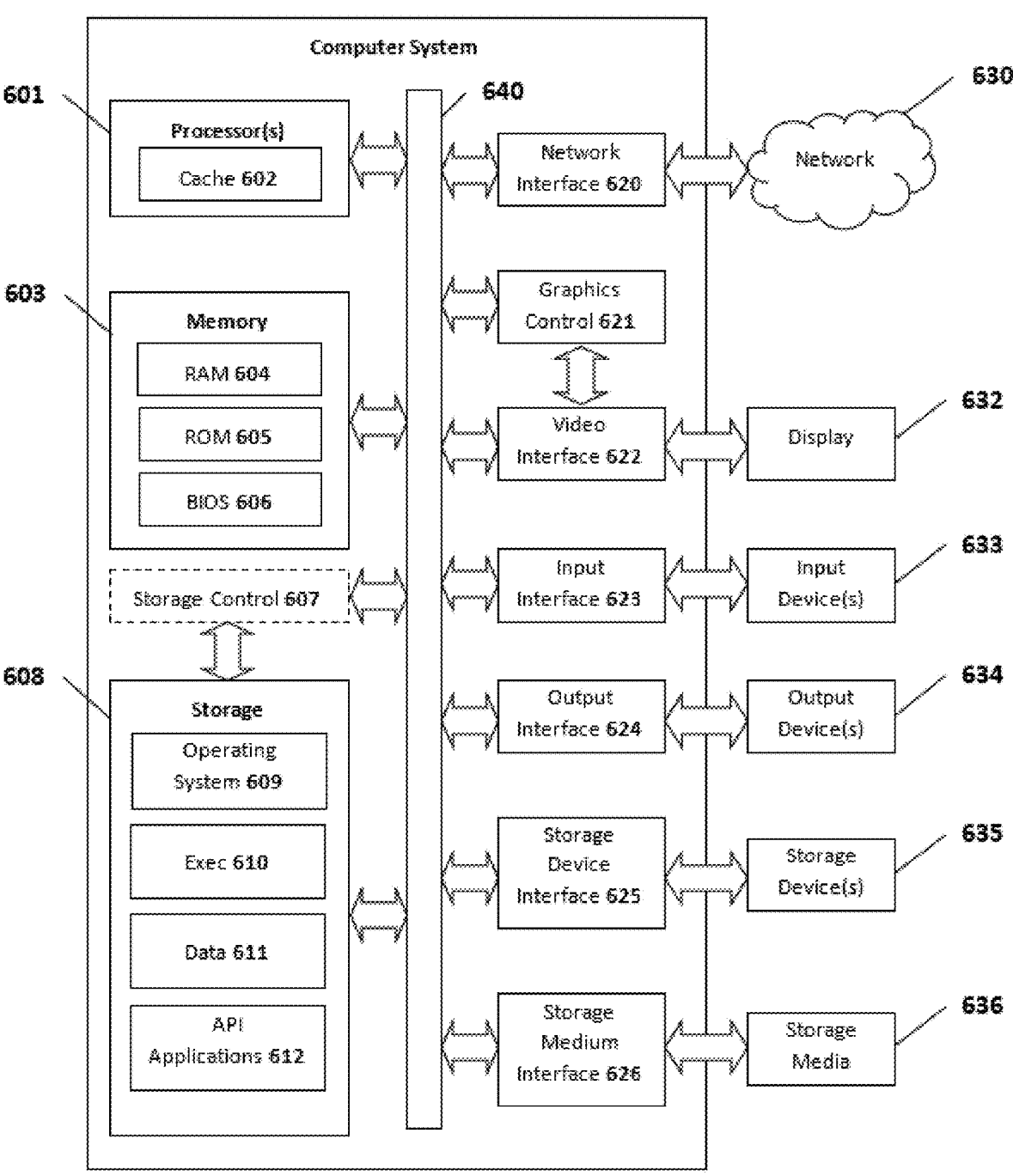
FIG. 6 shows a non-limiting example of a computing device; in this case, a device with one or more processors, memory, storage, and a network interface.

Referring to FIG. 6, a block diagram is shown depicting an exemplary machine that includes a computer system 600 (e.g., a processing or computing system) within which a set of instructions can execute for causing a device to perform or execute any one or more of the aspects and/or methodologies for static code scheduling of the present disclosure. The components in FIG. 6 are examples only and do not limit the scope of use or functionality of any hardware, software, embedded logic component, or a combination of two or more such components implementing particular embodiments.

Computer system 600 may include one or more processors 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 600 includes one or more processor(s) 601 (e.g., central processing units (CPUs), general purpose graphics processing units (GPGPUs), or quantum processing units (QPUs)) that carry out functions. Processor(s) 601 optionally contains a cache memory unit 602 for temporary local storage of instructions, data, or computer addresses. Processor(s) 601 are configured to assist in execution of computer readable instructions. Computer system 600 may provide functionality for the components depicted in FIG. 6 as a result of the processor(s) 601 executing non-transitory, processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., static RAM (SRAM), dynamic RAM (DRAM), ferroelectric random access memory (FRAM), phase-change random access memory (PRAM), etc.), a read-only memory component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, executable(s) 610, data 611, applications 612 (application programs), and the like. Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide non-volatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, distributed computing systems, cloud storage systems, cloud computing systems, and the like, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 632, computer system 600 may include one or more other peripheral output devices 634 including, but not limited to, an audio speaker, a printer, a storage device, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, distributed computing platforms, server clusters, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows Mobile® SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of psychometric, behavioral, contextual, relationship, demographic, and observational information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the applications, systems, and methods described herein and are not meant to be limiting in any way.

Example 1—CRE & Compatibility Score Generation Between CREs

In one illustrative embodiment, the system is configured to facilitate group activity matching. The system receives a plurality of CREs. Each CRE represents a synthesized compatibility profile of a group across multiple attributes relevant to group interactions, such as communication style, activity preferences, and collaborative problem-solving tendencies.

A relational synthesis engine evaluates the compatibility of each CRE with other CREs to determine optimal group assignments for the activity, producing compatibility scores that indicate which groupings are most likely to result in positive, cooperative, and enjoyable interactions. Groups with the highest compatibility scores are recommended to participate in the group activity together.

During the group activity, the system captures feedback from observed interactions among the groups, such as cooperative task performance, engagement levels, and satisfaction metrics. After the activity, the system updates one or more model parameters based on this feed-back using an adaptive learning mechanism, thereby improving the accuracy of future compatibility predictions for group activity matching. Over time, the system refines group assignments, ensuring that groups are paired with other compatible groups and optimizing overall experiences.

Example 2—Cross Domain Parameter Sharing

In one illustrative embodiment, the system is configured to facilitate both professional and social collaboration matching. The system receives Composite Relational Entities (CREs) specific to a social domain from two or more discrete entity profiles, wherein each CRE represents a synthesized compatibility between the participants based solely on social attributes relevant to group interaction, networking, or recreational collaboration. Each CRE represents a synthesized relational representation of the contributing entities, capturing both individual features and higher-order interactions among the participants, and is structured to allow iterative refinement based on subsequent updates.

Concurrently, the system receives CREs specific to a professional domain, wherein each CRE represents a synthesized compatibility between the participants based solely on professional attributes. The received CREs are then processed by a compatibility engine specific to a domain. The compatibility engine performs local processing and refinement of CREs, generating compatibility scores and updating parameters based on observed outcomes within its respective domain.

The compatibility engine processes each CRE to produce a compatibility score for the associated entities. Then, observed outcomes such as engagement metrics, mutual approval events, and interaction durations are collected from the participating entities. These outcomes are compared with the predicted compatibility scores, and CRE parameters are updated through a gradient-based adaptive feedback routine. These local updates create a feedback loop within each domain, refining CREs iteratively before any cross-domain synchronization occurs Following local parameter updates specific to each domain, the synchronization engine receives the updated parameters to enable cross-domain alignment. Trust coefficients specific to each domain are applied to each parameter update, thereby trust-weight scaling each parameter update. The scaled updates are then used to compute a network-wide aggregated parameter set using a trust-weighted averaging method. This aggregated set represents a consensus of the distributed learning across both social and professional domains while preserving the influence of each domain according to its trust score. The aggregated parameters are structured to enhance the sophistication of subsequent CRE updates, providing cross-domain insights that each domain alone could not capture.

Once the aggregated CRE parameters are computed, the network-wide update is distributed back to each domain-specific compatibility engine, and each engine incorporates the aggregated CRE parameters into its local model. Incorporation of these aggregated parameters enables each domain engine to perform more sophisticated CRE updates, improving compatibility predictions and aligning relational representations across social and professional contexts.

Example 3—Performance Evaluation of Selective Transmission Synchronization

In one illustrative embodiment, the system was evaluated for performance using a benchmark designed to evaluate the performance of the system in transmitting parameter updates to large matrix structures between different parts of the system. The test ran on Ubuntu 22.04 operating system with Python 2.10 and PyTorch 2.x, using hardware capable of allocating a 10,000×10,000 float32 tensor.

The benchmark compared a baseline full-transmission method with the selective transmission method of the system according to embodiments described herein. In the baseline configuration, each of four nodes transmitted its entire 10,000-column slice during a synchronization cycle. In the configuration of the system, each node transmitted only the first 40% of its assigned columns, and the remaining columns were reconstructed at the aggregator using deterministic zero padding. This resulted in a fixed 60% reduction in transmitted data while maintaining the size of the data for later calculations.

The procedure included creating the full 10,000×10,000 table, splitting it into four slices of 2,500 rows each, performing the baseline transmission, performing the selective transmission with reconstruction, averaging the results across nodes, and calculating the mean absolute error (MAE) between the baseline and reconstructed tables. The test was repeated five times using fixed random seeds. Each run measured how much data was sent, how accurate the reconstruction was (MAE), how long synchronization took, and the overall speed of the process.

In all runs, the selective transmission method achieved the expected 60% reduction in data sent compared to the baseline. The reconstructed tables were very close to the original, with MAE near the smallest measurable differences. The test also showed that the method behaved consistently, producing the same transmission ratios and stable reconstruction in every run.

What is claimed is:

1. A computer-implemented method for governance-gated propagation, compatibility evaluation, and cross-domain coordination of composite relational entities (CREs) executed at one or more computer processors, the method comprising:
   (a) receiving one or more CREs generated by a synthesis engine, wherein each CRE represents two or more entities;
   (b) conducting a first validation of a CRE of the one or more CREs comprising validating a persistent identifier and a lineage anchor of the CRE;

(c) upon a successful result of the first validation, processing the CRE by performing operations comprising:
   i) computing a compatibility score for the CRE based on governance metadata, trust coefficients, and an interpretability vector included in the CRE, wherein the compatibility score represents compatibility between the entities,
   ii) capturing feedback associated with at least one of the two or more entities,
   iii) computing a residual deviation between the compatibility score and the feedback,
   iv) applying a governance-weighted update rule to modulate the residual deviation based on the governance metadata and the trust coefficients,
   v) updating one or more parameters of the CRE based at least in part on the modulated residual deviation, and
   vi) generating a CRE delta, wherein the CRE delta represents a difference between the updated one or more parameters and the one or more parameters of the CRE;
   (d) conducting a second validation of the CRE comprising validating the persistent identifier, the lineage anchor, an audit signature, and the governance metadata; and
   (e) upon a successful result of the second validation, propagating the CRE delta.

2. The method of claim 1, wherein the lineage anchor comprises a timestamp, hash, or cryptographic marker referencing a prior CRE state.

3. The method of claim 1, wherein the audit signature is associated with the persistent identifier and the lineage anchor.

4. The method of claim 1, wherein propagation is rejected when lineage continuity validation fails.

5. The method of claim 1, wherein CREs are structurally non-substitutable with embeddings, weighted attribute vectors, or similarity metrics, and wherein CREs comprise normalized multi-attribute vectors.

6. The method of claim 1, wherein the trust coefficients are based on historical consistency of underlying entity attributes associated with the CRE.

7. The method of claim 1, wherein the governance metadata comprises a governance weight applied during compatibility score computation and CRE delta propagation.

8. The method of claim 1, wherein the interpretability vector quantifies contributions of relational attributes of the two or more entities to the computation of the compatibility score.

9. The method of claim 1, wherein computing the residual deviation comprises applying a temporally weighted deviation term.

10. The method of claim 1, wherein capturing feedback comprises collecting behavioral outcome data.

11. The method of claim 1, wherein the CRE comprises metadata embedded directly into a latent data structure of the CRE, thereby enforcing metadata inseparability.

12. The method of claim 1, further comprising computing a second compatibility score between two or more of the CREs based on respective governance metadata, trust coefficients, and interpretability vectors included in the two or more CREs, wherein the second compatibility score represents compatibility between the CREs.

13. A non-transitory computer-readable medium storing instructions that, when executed by one or more computer processors, cause the processors to perform the method of claim 1.

14. The computer-readable medium of claim 13, wherein the instructions further cause the one or more processors to enforce metadata inseparability for all CREs.

15. The computer-readable medium of claim 13, wherein the instructions further cause the one or more processors to recalculate the audit signature after propagation.

16. A computer-implemented system for governance-gated propagation, compatibility evaluation, and cross-domain coordination of composite relational entities (CREs) comprising at least one computer processor and at least one non-transitory computer readable medium storing instructions executable by the at least one computer processor to implement an application comprising:

(a) a CRE-intake program module receiving one or more CREs, wherein each CRE represents two or more entities;

(b) a validation program module performing:

i) a first validation of a persistent identifier, and a lineage anchor of a CRE of the one or more CREs, and ii) a second validation of the persistent identifier, the lineage anchors, and an audit signature of the CRE;

(c) a compatibility software engine computing a compatibility score from the CRE based on governance metadata, trust coefficients, and an interpretability vector included in the CRE upon a successful result of the first validation, wherein the compatibility score represents compatibility between the entities;

(d) a governance-weighted update program module, upon a successful result of the first validation:

i) computing a residual deviation between the compatibility score and feedback, ii) applying a governance-weighted update rule to modulate the residual deviation based on the governance metadata and the trust coefficients, iii) updating one or more parameters of the CRE based at least in part on the modulated residual deviation, and iv) generating a CRE delta, wherein the CRE delta represents a difference between the updated one or more parameters and the one or more parameters of the CRE; and (e) a synchronization software engine propagating the CRE delta upon a successful result of the second validation.

17. The system of claim 16, wherein the at least one computer processor comprises a secure execution enclave.

18. The system of claim 17, wherein the secure execution enclave is a trusted execution environment (TEE).

19. The system of claim 17, wherein at least the propagation occurs within the secure execution enclave.

20. The system of claim 16, wherein the synchronization engine is configured to block propagation of the CRE delta if the governance metadata fails a validation.

21. The system of claim 16, wherein the compatibility engine is configured to recalculate the interpretability vector after the second validation.

22. The system of claim 16, wherein the validation module is configured to output a rejection state when the first validation or the second validation are unsuccessful.

23. The system of claim 16, wherein the compatibility engine is configured to compute a second compatibility score between two or more of the CREs based on respective governance metadata, trust coefficients, and interpretability vectors included in the two or more CREs, wherein the second compatibility score represents compatibility between the CREs.

24. A computer-implemented method for governance-gated propagation, compatibility evaluation, and cross-domain coordination of composite relational entities (CREs) executed at one or more computer processors, the method comprising:

(a) receiving, a plurality of CREs generated by two or more domain-specific synthesis engines, wherein each CRE represents two or more entities;

(b) conducting a first validation of two or more of the plurality of CREs comprising validating persistent identifiers, lineage anchors, and audit signatures of the two or more CREs;

(c) upon a successful result of the first validation, evaluating relational compatibility between the two or more CREs thereby generating a compatibility score;

(d) updating one or more parameters of each of the two or more CREs;

(e) generating a CRE delta for each of the two or more CREs, wherein the CRE delta represents a difference between the updated one or more parameters and the one or more parameters of each CRE;

(f) conducting a second validation of the two or more CREs comprising validating the persistent identifiers, the lineage anchors, and the audit signatures of the two or more CREs; and (g) upon a successful result of the second validation, propagating the CRE deltas across a plurality of domains.

25. The method of claim 24, wherein each CRE comprises a domain identifier configured to restrict cross-domain reuse.

26. The method of claim 24, wherein the two or more domain-specific synthesis engines are configured to not share parameters unless governance conditions are satisfied.

27. The method of claim 24, wherein feedback is specific to a domain.

28. The method of claim 24, wherein propagating the CRE deltas is restricted unless a domain-continuity rule is satisfied.

29. The method of claim 24, wherein the two or more CREs are each generated by a relational synthesis engine specific to a different domain.

30. The method of claim 29, wherein generating the compatibility score comprises using a governance-weighted update rule.

* * * * *